US011826702B2

(12) United States Patent
Kim

(10) Patent No.: US 11,826,702 B2
(45) Date of Patent: Nov. 28, 2023

(54) OZONE DECOMPOSITION DEVICE

(71) Applicant: CAST CO., LTD., Seoul (KR)

(72) Inventor: Min Hwan Kim, Seoul (KR)

(73) Assignee: CAST CO., LTD., Seoul (KR)

( * ) Notice: Subject to any disclaimer, the term of this patent is extended or adjusted under 35 U.S.C. 154(b) by 0 days.

(21) Appl. No.: 18/245,225

(22) PCT Filed: Sep. 15, 2021

(86) PCT No.: PCT/KR2021/012581
§ 371 (c)(1),
(2) Date: Mar. 14, 2023

(87) PCT Pub. No.: WO2022/060081
PCT Pub. Date: Mar. 24, 2022

(65) Prior Publication Data
US 2023/0256389 A1    Aug. 17, 2023

(30) Foreign Application Priority Data
Sep. 15, 2020 (KR) .................. 10-2020-0118620

(51) Int. Cl.
*B01D 53/86* (2006.01)
(52) U.S. Cl.
CPC .. *B01D 53/8675* (2013.01); *B01D 2255/1021* (2013.01); *B01D 2255/2073* (2013.01)
(58) Field of Classification Search
CPC ........ B01D 53/8675; B01D 2255/1021; B01D 2255/2073
USPC ....................................................... 423/219
See application file for complete search history.

(56) References Cited

U.S. PATENT DOCUMENTS

2007/0060472 A1* 3/2007 Fisher .................. B01J 37/0232
502/238

FOREIGN PATENT DOCUMENTS

| CN | 210674742 U | * | 6/2020 |
| JP | 1991181320-000000 A | | 8/1991 |
| JP | 2003-310723 A | | 11/2003 |
| JP | 2006-525112 A | | 11/2006 |
| JP | 2008-250289 A | | 10/2008 |
| JP | 2019155006-000000 A | | 9/2019 |
| KR | 1020050048245 A | | 5/2005 |
| KR | 100555326 B1 | | 3/2006 |
| KR | 10-1006914 B1 | | 1/2011 |
| KR | 10-2014-0077426 A | | 6/2014 |

(Continued)

OTHER PUBLICATIONS

CN-210674742-U English translation (Year: 2020).*

*Primary Examiner* — Anita Nassiri-Motlagh
(74) *Attorney, Agent, or Firm* — NKL Law; Byungwoong Park

(57) ABSTRACT

The present disclosure includes a housing including an installation space formed therein, an inlet through which an external gas flows into the installation space, and an outlet through which a gas inside the installation space is discharged to the outside, a first ozone decomposition unit installed in the installation space of the housing to decompose ozone in the external gas flowing into the installation space inside the housing through the inlet, and a second ozone decomposition unit installed in the installation space of the housing to receive the gas decomposed by the first ozone decomposition unit and decompose residual ozone in the gas.

7 Claims, 4 Drawing Sheets

(56) References Cited

FOREIGN PATENT DOCUMENTS

KR    1020170125511 A    11/2017

\* cited by examiner

OZONE DECOMPOSITION DEVICE

BACKGROUND

Technical Field

The present disclosure relates to an ozone decomposition device, and more particularly, to an ozone decomposition device capable of shortening a decomposition time of unreacted ozone and simultaneously decomposing a larger amount of ozone by primarily decomposing unreacted ozone discharged after use through a catalytic reaction of a first ozone decomposition unit, and secondarily decomposing the ozone through a temperature reaction of a second ozone decomposition unit.

Background Art

Since ozone has strong sterilizing power and is capable of sterilization, organic matter decomposition, odor removal, and decolorization, the ozone is used in various fields such as air pollutant treatment, water treatment, and waste treatment. However, since the ozone has a strong oxidizing power, unreacted ozone discharged after use (hereinafter referred to as 'ozone off-gas') has a fatal influence on a human body, such as causing physical discomfort such as eye inflammation and headache, and reducing resistance to cold and pneumonia to cause chronic heart disease, asthma, bronchitis, or the like.

In recent years, research on the development of a catalyst for decomposing the ozone off-gas and a system for treating the ozone off-gas has been conducted. Most of currently developed ozone decomposition devices are devices that decompose an ozone off-gas using a catalyst such as manganese dioxide or platinum, and have a problem in that it takes a long time to decompose the ozone off-gas and a large amount of ozone cannot be simultaneously decomposed because the ozone off-gas is simply decomposed through a reaction with a catalyst.

DETAILED DESCRIPTION OF THE INVENTION

Technical Challenge

The present disclosure is to solve the above problem, and an object of the present disclosure is to provide an ozone decomposition device capable of shortening a decomposition time of unreacted ozone and simultaneously decomposing a larger amount of ozone by primarily decomposing unreacted ozone discharged after use through a catalytic reaction of a first ozone decomposition unit, and secondarily decomposing the ozone through a temperature reaction of a second ozone decomposition unit.

Effects of the Invention

According to the present disclosure, the object is achieved by an ozone decomposition device including: a housing including an installation space formed therein, an inlet through which an external gas flows into the installation space, and an outlet through which a gas inside the installation space is discharged to the outside; a first ozone decomposition unit installed in the installation space of the housing to decompose ozone in the external gas flowing into the installation space inside the housing through the inlet; and a second ozone decomposition unit installed in the installation space of the housing to receive the gas decomposed by the first ozone decomposition unit and decompose residual ozone in the gas.

Here, the installation space inside the housing may be partitioned into a first installation space and a second installation space by a partition wall, a portion of the partition wall being opened so that the first installation space communicates with the second installation space, the first ozone decomposition unit may be installed in the first installation space, the second ozone decomposition unit may be installed in the second installation space, the inlet may be installed to communicate with the first installation space, and the outlet may be installed to communicate with the second installation space.

Meanwhile, the first ozone decomposition unit may include a support formed in a porous structure; and a catalyst supported on internal pores or surface of the support.

In this case, the catalyst may include at least one of manganese dioxide and platinum.

Further, the second ozone decomposition unit may include a thermal conductor formed to be bent a plurality of times; and a heat source connected to the thermal conductor to supply heat to the thermal conductor.

Further, a plurality of housings, a plurality of first ozone decomposition units, and a plurality of second ozone decomposition units may be provided, the housings may be formed in a mutually stacked state, the plurality of first ozone decomposition units may be formed to be disposed on the same vertical line, and the plurality of second ozone decomposition units may be formed to be disposed on the same vertical line.

Here, an auxiliary outlet formed in a lower portion of the housing to communicate with the first installation space, and an auxiliary inlet formed in an upper portion of the housing to communicate with the second installation space may be further included, the auxiliary outlet of the upper housing may be connected to the inlet of the lower housing, and the outlet of the upper housing may be connected to the auxiliary inlet of the lower housing.

Further, a plurality of housings, a plurality of first ozone decomposition units, and a plurality of second ozone decomposition units may be provided, the housings may be formed in a mutually stacked state, the upper housing and the lower housing are formed so that left and right sides thereof are reversed and the first ozone decomposition unit and the second ozone decomposition unit are alternately stacked on the same vertical line.

In this case, the outlet of the upper housing may be installed to be connected to the inlet of the lower housing.

Advantageous Effects

Thus, with the present disclosure, it is possible to shorten a decomposition time of unreacted ozone and simultaneously decompose a larger amount of ozone by primarily decomposing unreacted ozone discharged after use through a catalytic reaction of the first ozone decomposition unit, and secondarily decomposing the ozone through a temperature reaction of the second ozone decomposition unit.

DESCRIPTION OF EXEMPLARY EMBODIMENTS

Figure 1:
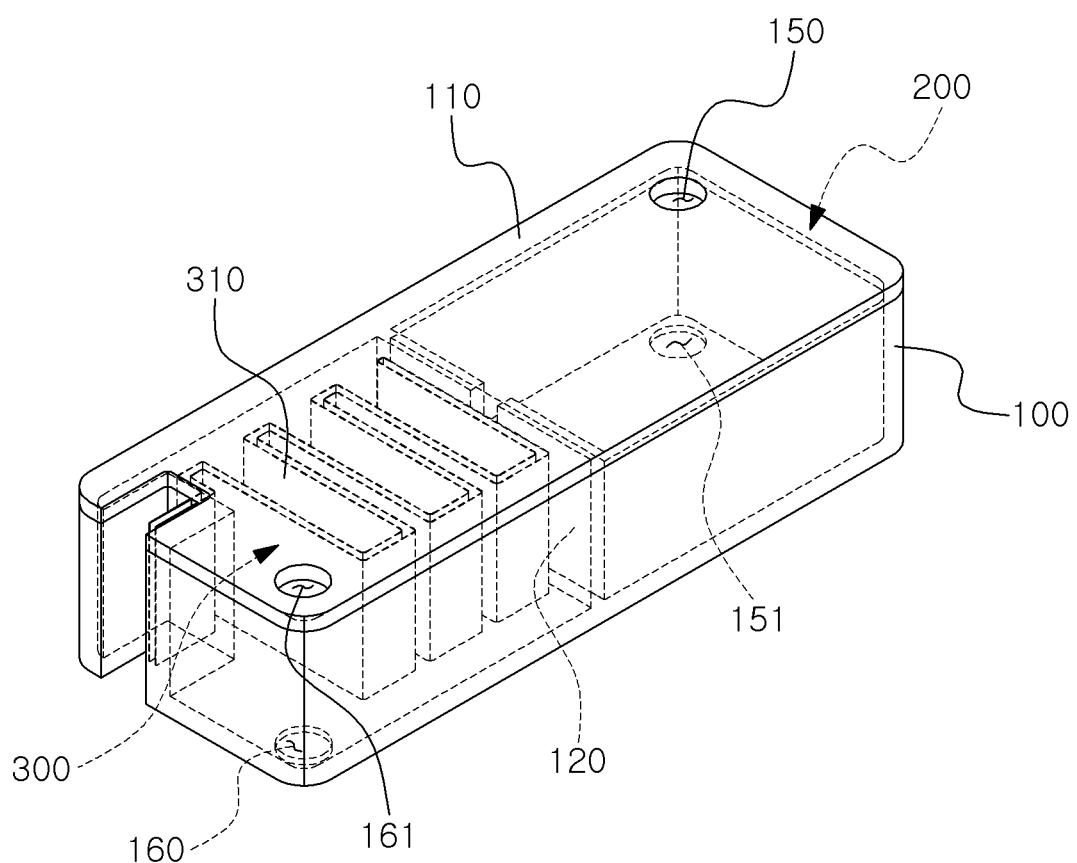
FIG. 1 is a perspective view of an ozone decomposition device according to the present disclosure.

Specific structural or functional descriptions of embodiments according to the concept of the present disclosure disclosed herein are only illustrated for the purpose of describing the embodiments according to the concept of the present disclosure, and the embodiments according to the concept of the present disclosure can be implemented in various forms and are not limited to the embodiments described herein.

Since various changes may be made to the embodiments according to the concept of the present disclosure, which may have several forms, the embodiments will be illustrated in the drawings and described in detail herein. However, this is not intended to limit the embodiments according to the concept of the present disclosure to specific disclosed forms, and changes, equivalents, or substitutions included in the spirit and scope of the present disclosure are included.

Although the terms first, second, etc. may be used to describe various components, the components should not be limited by the terms. The terms are only used to distinguish one component from other components. For example, a first component could be termed a second component and, similarly, a second component could be termed a first component without departing from the scope of the present disclosure.

It will be understood that when a component is referred to as being "connected" or "coupled" to another component, the component may be directly connected or coupled to the other component or intervening elements may be present. On the other hand, when a component is referred to as being "directly connected" or "directly coupled" to another component, there are no intervening elements present. Expressions describing a relationship between components, such as "between" and "directly between" or "adjacent to" and "directly adjacent to", should be construed similarly. The terms used herein are for the purpose of describing specific embodiments only and is not intended to limit the present disclosure. The singular forms "a," "an" and "the" are intended to include the plural forms as well, unless the context clearly indicates otherwise.

It will be understood that the terms "comprises," "comprising," "includes" and/or "including," herein specify the presence of stated features, integers, steps, operations, elements, and/or components, but do not preclude the presence or addition of one or more other features, integers, steps, operations, elements, components, and/or groups thereof. Unless otherwise defined, all terms including technical and scientific terms used herein have the same meaning as commonly understood by those skilled in the art to which the present disclosure belongs. It will be understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an ozone decomposition device according to a preferred embodiment of the present disclosure will be described with reference to the accompanying drawings.

Figure 2:
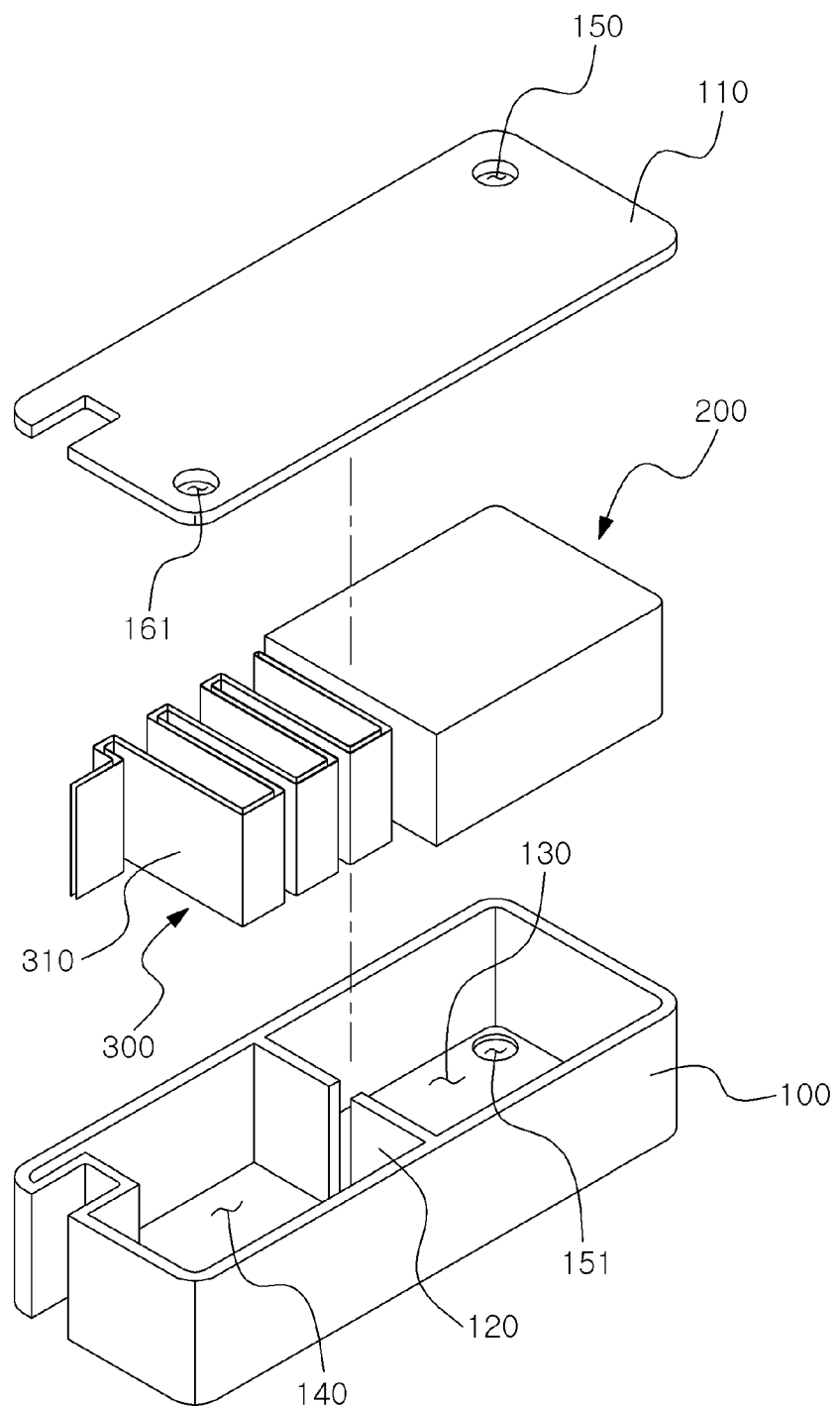
FIG. 2 is an exploded perspective view of the ozone decomposition device according to the present disclosure.

As illustrated in FIGS. 1 and 2, the ozone decomposition device according to the present disclosure includes a housing 100 including an installation space formed therein, an inlet 150 through which external gas flows into the installation space, and an outlet 160 through which a gas inside the installation space is discharged to the outside, a first ozone decomposition unit 200 installed in the installation space of the housing 100 to decompose ozone of external gas flowing into the installation space inside the housing 100 through the inlet 150, and a second ozone decomposition unit 300 installed in the installation space of the housing 100 to receive the gas decomposed by the first ozone decomposition unit 200 and decompose residual ozone in the gas.

First, the housing 100 is a substantially rectangular box-shaped structure with an open top, and includes an installation space formed therein, and a cover 110 for closing the installation space installed to close the open top. Here, the installation space inside the housing 100 is partitioned into a first installation space 130 and a second installation space 140 by a partition wall 120 installed inside the housing 100. In this case, a portion of the partition wall 120 is formed to be opened so that the first installation space 130 and the second installation space 140 can communicate with each other.

The inlet 150 for causing the external gas to flow into the installation space inside the housing 100 is a through hole formed with a predetermined diameter, and is formed to pass through the cover 110. The inlet 150 is formed in the cover 110 located above the first installation space 130 so that the outside of the housing 100 communicates with the first installation space 130.

The outlet 160 for discharging the gas inside the installation space to the outside of the housing 100 is a through hole formed with a predetermined diameter, and is formed to pass through a lower portion of the housing 100. The outlet 160 is formed in the lower portion of the housing 100 in which the second installation space 140 is formed, to enable the second installation space 140 to communicate with the outside of the housing 100.

Meanwhile, the present disclosure further includes an auxiliary outlet 151 formed in the lower portion of the housing 100 to communicate with the first installation space 130, and an auxiliary inlet 161 formed in an upper portion of the housing 100 to communicate with the second installation space 140.

The auxiliary outlet 151 is a through hole formed with a predetermined diameter, and is formed to pass through the lower portion of the housing 100. The auxiliary outlet 151 is formed in the lower portion of the housing 100 in which the first installation space 130 is formed, so that the first installation space 130 communicates with the outside of the housing 100.

Further, the auxiliary inlet 161 is a through hole formed with a predetermined diameter and is formed to pass through the cover 110. The auxiliary inlet 161 is formed in the cover 110 located above the second installation space 140 so that the outside of the housing 100 communicates with the first installation space 130.

When a plurality of housings 100 are provided and stacked, the auxiliary outlet 151 and the auxiliary inlet 161 are configured to enable the upper housing 100 and the lower housing 100 to communicate with each other, and when a single housing 100 is provided, the auxiliary outlet 151 and the auxiliary inlet 161 may be closed with a separate stopper (not illustrated).

The first ozone decomposition unit 200 is installed in the first installation space 130 and serves to primarily decompose ozone in an external gas flowing into the first installation space 130, and includes a support formed in a porous structure, and a catalyst supported on internal pores or surface of the support. Here, the catalyst may include at least one of manganese dioxide and platinum.

The first ozone decomposition unit 200 reacts with the ozone contained in the gas flowing into the first ozone decomposition unit 200 through the inlet 150 to decompose the ozone into oxygen and oxygen radical as follows.

$O_3$+catalyst (manganese dioxide or platinum)→$O_2$+O* (oxygen radical)

That is, the ozone contained in the gas flowing into the first ozone decomposition unit 200 through the inlet 150 is decomposed into oxygen by reacting with the catalyst of the first ozone decomposition unit 200.

The second ozone decomposition unit 300 is installed in the second installation space 140, serves to receive the gas primarily decomposed through the first ozone decomposition unit 200 and secondarily decompose the residual ozone in the gas, and includes a thermal conductor 310 formed to be bent a plurality of times, and a heat source (not illustrated) connected to the thermal conductor 310 to supply heat to the thermal conductor 310.

The thermal conductor 310 is a member formed by bending a plate made of metal having a predetermined thickness a plurality of times, and is installed inside the first installation space 130 and receives heat from a heat source (not illustrated) connected to one side to generate heat. Ozone remaining in the gas is decomposed by the heat of the thermal conductor 310, and resultant oxygen is discharged to the outside of the housing 100 through the outlet 160.

TABLE 1

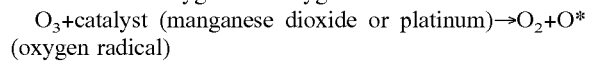

| Temperature | Half-life |
|---|---|
| −50° C. | 3 months |
| −35° C. | 18 days |
| −25° C. | 8 days |
| 20° C. | 3 days |
| 120° C. | 1.5 hours |
| 250° C. | 1.5 seconds |

Table 1 above shows a half-life of ozone at each temperature, and the ozone is decomposed after about 1.5 hours at 120° C. and is decomposed after 1.5 seconds at 250° C. The second ozone decomposition unit 300 may adjust the temperature of the thermal conductor 310 according to an amount of residual ozone or an amount of ozone flowing into the housing 100, and decomposes the ozone into oxygen using the heat of the thermal conductor 310.

The amount of residual ozone or the amount of gas flowing into the housing 100 may be detected by a separate sensor.

As described above, the ozone in the gas flowing into the housing 100 is primarily decomposed by the first ozone decomposition unit 200, and the residual ozone in the gas decomposed by the first ozone decomposition unit 200 is secondarily decomposed by the second ozone decomposition unit 300, making it possible to shorten an ozone decomposition time and simultaneously decompose a larger amount of ozone.

Figure 3:
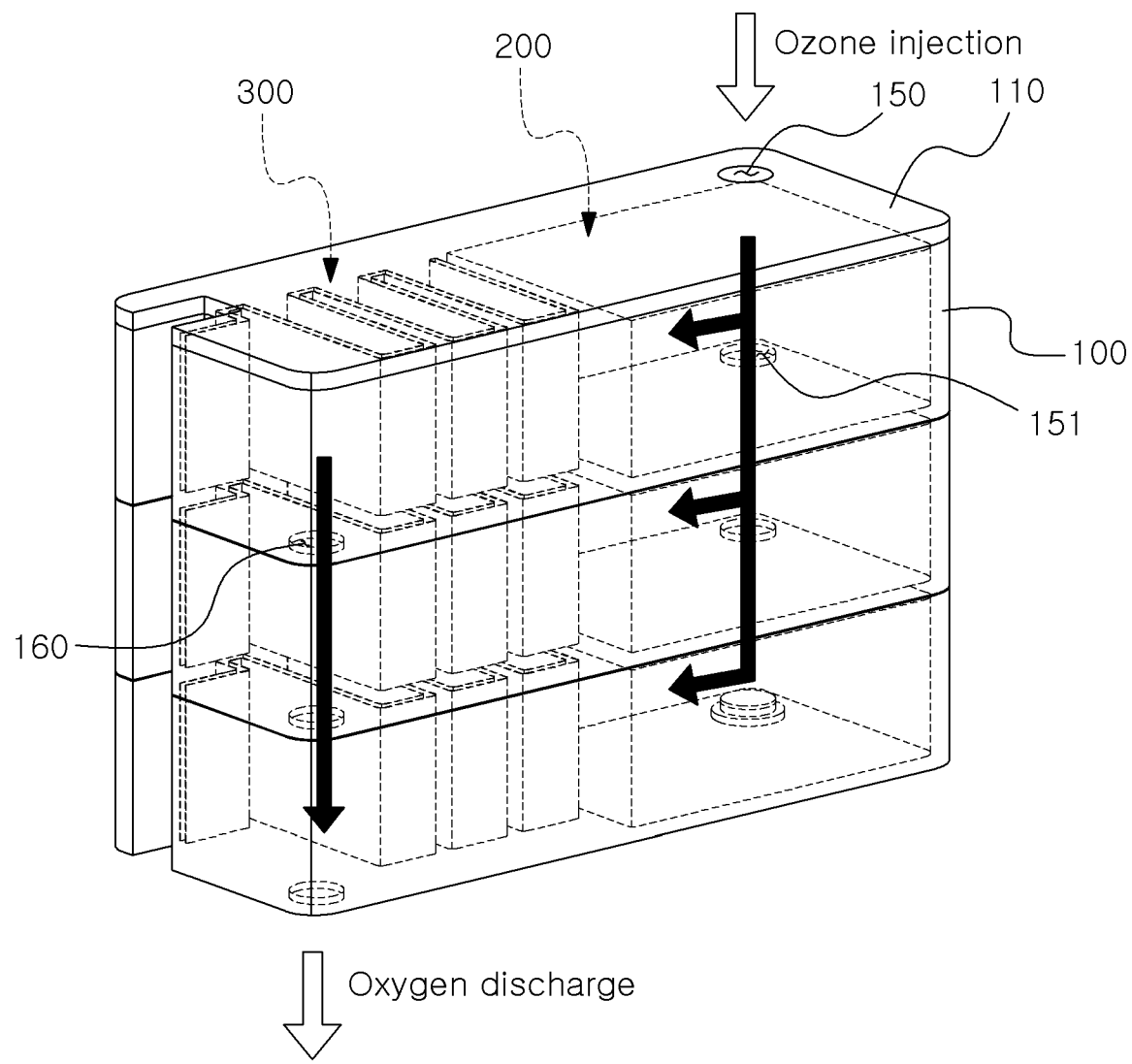
FIG. 3 is a perspective view of an ozone decomposition device according to an embodiment of the present disclosure.

FIG. 3 is a view illustrating an embodiment of the present disclosure, and in the embodiment of the present disclosure, a plurality of housings 100, a plurality of first ozone decomposition units 200, and a plurality of second ozone decomposition units 300 are provided, and the housings 100 in which the first ozone decomposition unit 200 and the second ozone decomposition unit 300 are installed are formed in a mutually stacked state.

In this case, the plurality of first ozone decomposition units 200 are formed to be disposed on the same vertical line, and the plurality of second ozone decomposition units 300 are also formed to be disposed on the same vertical line.

In this case, the auxiliary outlet 151 of the upper housing 100 may be connected to the inlet 150 of the lower housing 100, and the outlet 160 of the upper housing 100 may be connected to the auxiliary inlet 161 of the lower housing 100.

A case in which the cover 110 is formed only on the uppermost housing 100 is illustrated in FIG. 3, and thus, even when the auxiliary inlet 161 is not present in the lower housing, the first installation space 130 of the upper housing 100 communicates with the first installation space 130 of the lower housing 100, and the second installation space 140 of the upper housing 100 communicates with the second installation space 140 of the lower housing 100.

In the embodiment of the present disclosure formed as described above, when the external gas flows into the inside through the inlet 150 of the uppermost housing 100, the ozone in the external gas is primarily decomposed by the first ozone decomposition unit 200. Thereafter, the second ozone decomposition unit 300 receives the primarily decomposed gas, secondarily decomposes the ozone, and discharges the decomposed oxygen through the lowermost outlet 160.

Figure 4:
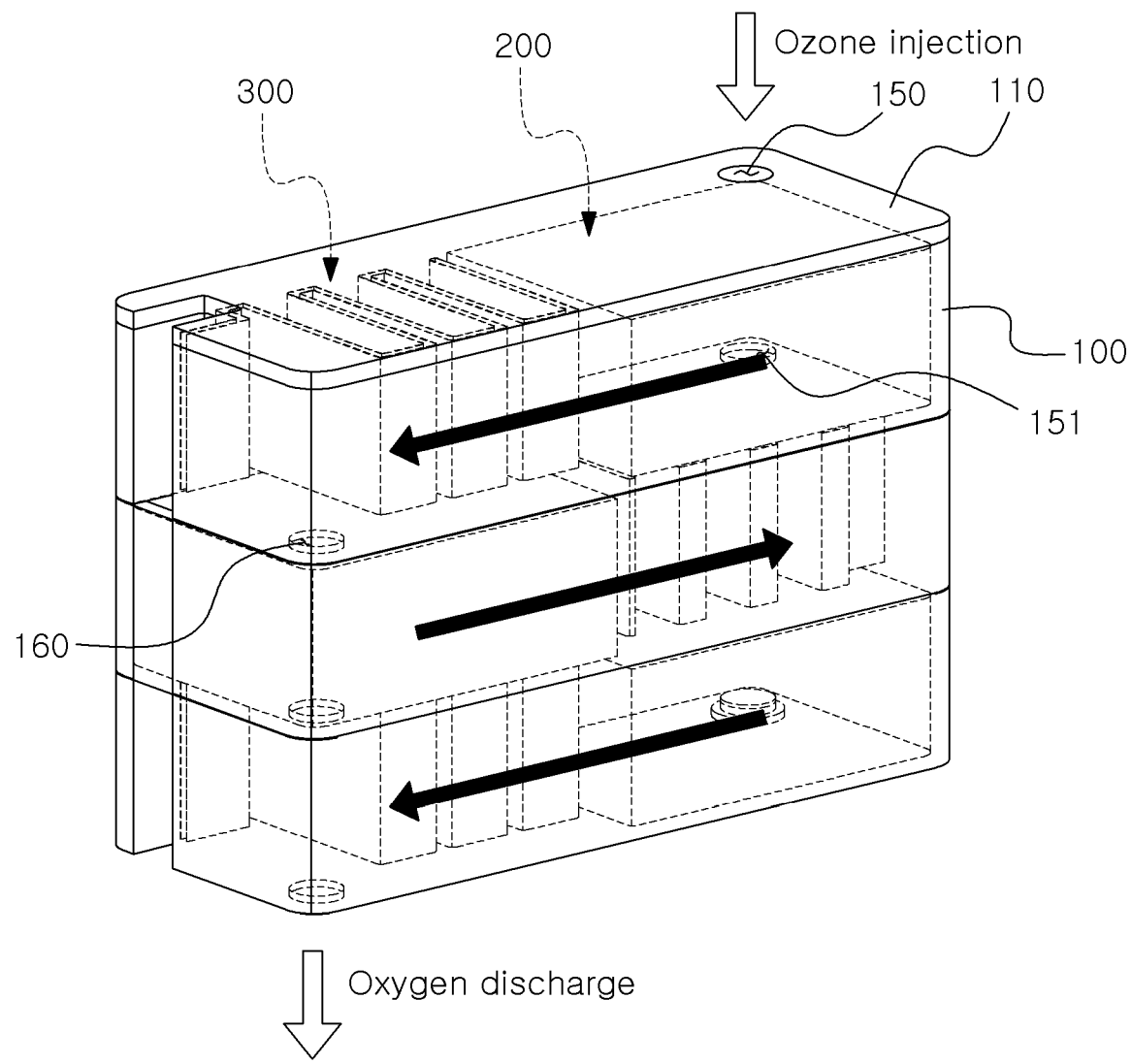
FIG. 4 is a perspective view of an ozone decomposition device according to another embodiment of the present disclosure.

Meanwhile, FIG. 4 is a view illustrating another embodiment of the present disclosure, and in the other embodiment of the present disclosure, a plurality of housings 100, a plurality of first ozone decomposition units 200, and a plurality of second ozone decomposition units 300 are provided, and the housings 100 in which the first ozone decomposition unit 200 and the second ozone decomposition unit 300 are installed are formed in a mutually stacked state.

In this case, the upper housing 100 and the lower housing 100 are formed so that left and right sides thereof are reversed and the first ozone decomposition unit 200 and the second ozone decomposition unit 300 are alternately disposed on the same vertical line.

In this case, the outlet 160 of the upper housing 100 may be installed to be connected to the inlet 150 of the lower housing 100.

Since a case in which the cover 110 is formed only on the uppermost housing 100 is illustrated in FIG. 4, the outlet 160 of the upper housing 100 may directly communicate with the first installation space 130 of the lower housing 100.

In the other embodiment of the present disclosure formed as described above, an external gas flows into the inside through the inlet 150 of the uppermost housing 100, ozone of the external gas is primarily decomposed by the first ozone decomposition unit 200, and the second ozone decomposition unit 300 receives the primarily decomposed gas and secondarily decomposes the ozone. Then, the lower housing receives the decomposed gas and decomposes the ozone again through the first ozone decomposition unit 200 and the second ozone decomposition unit 300. Thus, in the other embodiment of the present disclosure, since a process of decomposing the ozone is repeatedly performed, it is possible to greatly reduce an amount of ozone discharged without being decomposed.

The preferred embodiment of the ozone decomposition device according to the present disclosure has been described above.

It should be understood that the above-described embodiments are illustrative in all respects and not restrictive, and the scope of the present disclosure will be indicated by the claims to be described below rather than the above-described detailed description. It should be construed that all changes and modifications derived from the meaning and scope of the claims, as well as equivalent concepts thereof, are included in the scope of the present disclosure.

What is claimed is:

1. An ozone decomposition device comprising:
   a plurality of housings including an installation space formed therein, an inlet through which an external gas flows into the installation space, and an outlet through which a gas inside the installation space is discharged to the outside;
   a first ozone decomposition unit installed in the installation space of each of the plurality of housings to decompose ozone in the external gas flowing into the installation space inside each of the plurality of housings through the inlet; and
   a second ozone decomposition unit installed in the installation space of each of the plurality of housings to receive the gas decomposed by the first ozone decomposition unit and decompose residual ozone in the gas,
   wherein the installation space inside each of the plurality of housings is partitioned into a first installation space and a second installation space by a partition wall, a portion of the partition wall being opened so that the first installation space communicates with the second installation space via the opened portion of the partition wall,
   the first ozone decomposition unit is installed in the first installation space to communicate with an auxiliary outlet,
   the second ozone decomposition unit is installed in the second installation space to communicate with an auxiliary inlet,
   the inlet is installed to communicate with the first installation space, and
   the outlet is installed to communicate with the second installation space,
   wherein the auxiliary outlet and the auxiliary inlet are configured to be closed depending on a predetermined usage mode of the plurality of housings,
   wherein the plurality of housings are configured to be stacked in a vertical direction,
   wherein the first installation space and the second installation space are arranged in horizontal direction, side by side, in each of the plurality of housings.

2. The ozone decomposition device according to claim 1, wherein the first ozone decomposition unit includes
   a support formed in a porous structure; and
   a catalyst supported on internal pores or surface of the support.

3. The ozone decomposition device according to claim 2, wherein the catalyst includes at least one of manganese dioxide and platinum.

4. The ozone decomposition device according to claim 1, wherein the second ozone decomposition unit includes
   a thermal conductor formed to be bent a plurality of times; and
   a heat source connected to the thermal conductor to supply heat to the thermal conductor.

5. The ozone decomposition device according to claim 1, wherein the predetermined usage mode of the plurality of housings comprises a usage mode that only one of the plurality of housings is utilized separately from the other housings, and the auxiliary outlet and the auxiliary inlet at the only one of the plurality of housings are closed.

6. The ozone decomposition device according to claim 1, wherein the predetermined usage mode of the plurality of housings comprises a usage mode that
   a plurality of first ozone decomposition units of the plurality of housings are arranged to be disposed on a first vertical line, and a plurality of second ozone decomposition units of the plurality of housings are arranged to be disposed on a second vertical line, and
   the auxiliary outlet of at least one upper housing of the plurality of housings is arranged to be connected to the inlet of at least one lower housing of the plurality of housings, and the outlet of the at least one upper housing is arranged to be connected to the auxiliary inlet of the at least one lower housing.

7. The ozone decomposition device according to claim 1, wherein the predetermined usage mode of the plurality of housings comprises a usage mode that
   at least one upper housing and at least one lower housing of the plurality of housings are arranged such that a side of the first installation space and a side of the second installation space thereof are reversed in horizontal direction and the first ozone decomposition unit of the at least one upper housing and the second ozone decomposition unit of the at least one lower housing are alternately disposed on a first vertical line, and the second ozone decomposition unit of the at least one upper housing and the first ozone decomposition unit of the at least one lower housing are alternately disposed on a second vertical line, and
   the outlet of the at least one upper housing is arranged to be connected to the inlet of the at least one lower housing.

* * * * *